(12) United States Patent
Jaworski et al.

(10) Patent No.: US 6,381,408 B1
(45) Date of Patent: Apr. 30, 2002

(54) ELECTRIC FUMIGATOR

(75) Inventors: Thomas Jaworski, County of Racine, WI (US); Kenneth W. Michaels, County of McHenry, IL (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/919,080

(22) Filed: Jul. 31, 2001

(51) Int. Cl.[7] .............................................. A01M 13/00
(52) U.S. Cl. ......................... 392/392; 392/390; 43/125
(58) Field of Search ................................. 392/386, 387, 392/390, 391, 392, 403, 405, 406; 43/125, 129

(56) References Cited

U.S. PATENT DOCUMENTS

| | | | | |
|---|---|---|---|---|
| 2,714,649 A | | 8/1955 | Critzer | |
| 2,813,187 A | * | 11/1957 | Rovira | 392/390 |
| 3,872,280 A | * | 3/1975 | VanDalen | 392/390 |
| 4,214,146 A | | 7/1980 | Schimanksi | |
| 4,391,781 A | | 7/1983 | van Lit | |
| 5,402,517 A | * | 3/1995 | Gillett et al. | 392/390 |
| 5,647,052 A | * | 7/1997 | Patet et al. | 392/390 |
| 5,796,914 A | | 8/1998 | Gatzemeyer et al. | |
| 6,044,202 A | | 3/2000 | Junke | |

* cited by examiner

*Primary Examiner*—Sang Paik

(57) ABSTRACT

An electric fumigation device includes an outer housing encasing a cavity that contains a heat-activatable fumigant. A heating assembly, including electrical plugs fixedly attached to an electrical heater, extends partially into the housing to deliver heat to the cavity and activate the fumigant. The device further includes a trap that receives any liquified fumigant escaping from the cavity, thereby rendering the fumigation device operable regardless of the angular orientation of the electrical outlet on a vertical wall.

7 Claims, 4 Drawing Sheets

ELECTRIC FUMIGATOR

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The present invention relates to wall mountable, electrically activated, fumigation devices that are suitable for use with electric sockets having varied alignments relative to the wall.

Device are known for fumigating an enclosed area, such as a room of a house, by expelling a fumigant (e.g. typically an insecticide or fragrance) upon an application of heat. As disclosed in U.S. Pat. No. 5,796,914, some of these devices include a canister containing the fumigant, and an electric heater positioned adjacent the fumigant. When activated, the device produces a fog that is expelled out to fumigate the room.

Before the application of heat the fumigant is typically in solid form. It subsequently transforms into a slightly flowable gel material in response to the initial introduction of heat. Further heating will produce the fog. During the gel phase there is thus a spilling potential if the outlet of the device is pointed downwardly and no other structures are provided to avoid the problem.

Complicating matters, on a vertical wall blade sockets are typically either side by side, or alternatively one over the other. One previous fumigation device, U.S. Pat. No. 2,714,749, included a horizontally disposed vaporizer whose horizontally extending heater was inserted into the fumigant. There was an outer housing which retained the fumigant until it was dispensed. The housing was rotatable around the heater to orient a retaining cavity portion of the housing in a downward position and an outlet portion of the housing in an upward position, regardless of wall electrical outlet configuration.

Other approaches for avoiding the theoretical spill problem relied on using fumigants which did not have to go through a flow state during heating. For example, there have been numerous systems where a pad is impregnated with fumigant, and then later heated to directly release the vapors. See e.g. U.S. Pat. Nos. 4,214,146; 4,391,781; and 6,044,202. Unfortunately, there are applications where the use of flowable type fumigants is preferred.

U.S. Pat. No. 5,796,914 tried an improved approach of using a flowable type fumigant, albeit with spill protection. It provided a plug mounted on an angle with respect to the housing, thus allowing the mouth to be positioned at least somewhat upwardly regardless of the orientation of the electrical outlet. A potential disadvantage of this device was that the orientation of the mouth of the canister was fixed at an angle with respect to the electrical plugs, so that the level of fumigant in the canister was limited to some extent.

As such, a need still exists for electrical fumigators that dispense preferred foggers while providing flexibility in mounting.

BRIEF SUMMARY OF THE INVENTION

In one aspect the invention provides an electric fumigation device. There is a housing including a delivery port positioned essentially along a longitudinal axis of the housing, and a storage cavity located within the housing having an outlet in communication with the housing delivery port, the cavity containing a heat-activatable fumigant.

There is also a heater assembly having an electrical plug extending outwardly from an end of the housing opposite the delivery port (the plug being configured to be received by an electrical outlet), and a heater extending between outer radial walls of the housing. The heating device is in electrical communication with the electrical plug and in thermal communication with the fumigant in the cavity. There is also a trap a formed outside the cavity between the housing and heater, the trap being in part between the outlet and the delivery port.

In preferred forms, the heater extends essentially horizontally between outer radial walls of the housing along the longitudinal axis of the housing, the delivery port has a horizontally extending aperture downstream of the cavity, and either the heater extends into the cavity, or the heater is disposed entirely outside the cavity. If desired, the housing and/or heater can be essentially ball-shaped.

In another aspect the invention provides a method of fumigating an area in which an electrical receptacle is mounted on a wall with a fumigant. One provides an electrically activatable device of the above kind. One then plugs the fumigating device into the electrical receptacle and allows electricity from the electrical receptacle to cause a release of the fumigant.

The present invention achieves mounting flexibility for allowing the device to be received by an electrical receptacle on a vertical wall in any angular orientation, without sacrificing heat performance, or increasing spill potential. Because the delivery port is along the longitudinal axis of the housing, it is never pointed downward. Further, the fumigant is similarly arrayed relative to the heater regardless of how the device is plugged in.

The trap prevents the spillage of liquified fumigant from the device. Furthermore, the delivery port directs fumigant vapors away from the wall and into the interior of a room to be fumigated. This not only assists in distribution of the vapors, it also protects wall treatments and/or minimizes the need to clean the wall around the device.

Placing the heater between housing outer radial walls insures better thermal transfer. It also permits a compact design.

The foregoing and other advantages of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention. Reference must therefore be made to the claims herein for interpreting the scope of the invention.

DETAILED DESCRIPTION OF THE PREFERRED EMBODIMENT

Figure 1:
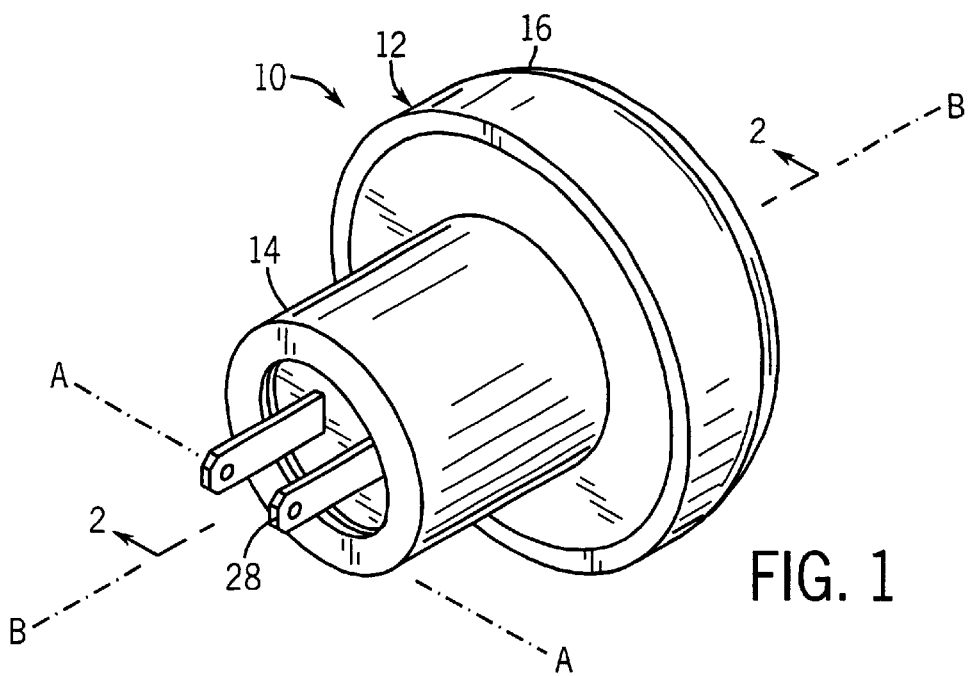
FIG. 1 is a rear upper perspective view of a first embodiment of an electrical fumigation device of the present invention.
Figure 2:
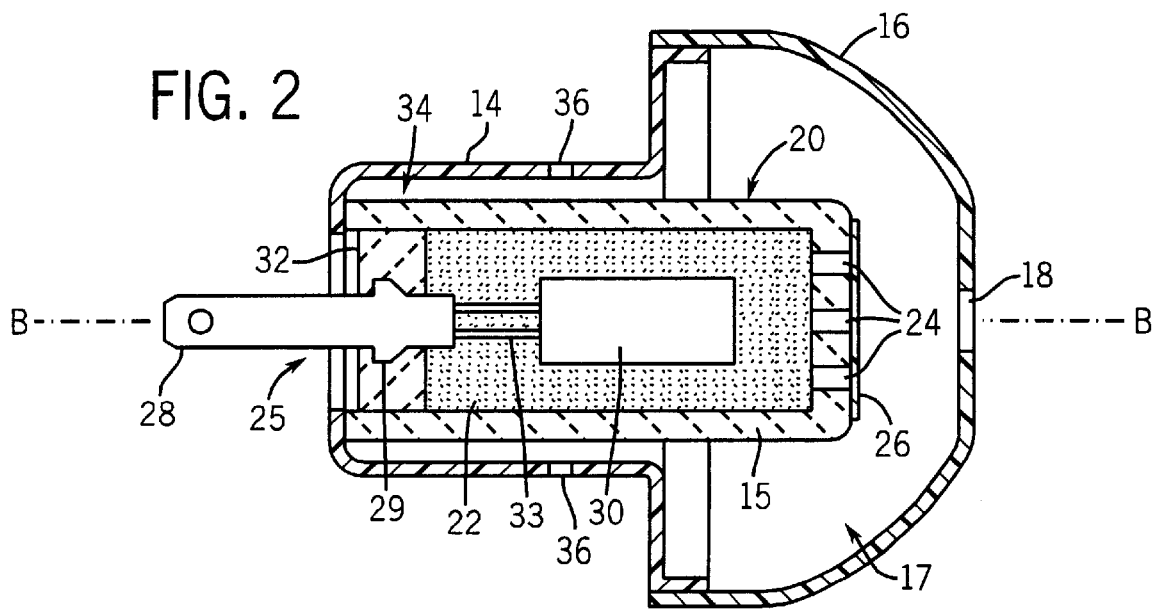
FIG. 2 is a cross sectional view taken along line 2—2 of FIG. 1.

Referring initially to FIGS. 1 and 2, an axially extending, electrically activated fumigation device 10 is suitable to be plugged into a standard electrical receptacle (not shown) on a vertical wall, regardless of socket orientation, so as to expel heat-activated fumigant 22 horizontally outward into an ambient environment. Alternatively, the device 10 could be plugged into a socket on a horizontal counter top. Thus, for purposes of this application, "horizontal" is intended to mean in a direction essentially perpendicular to the wall where the outlet is.

Device 10 includes a mushroom-shaped housing 12 having a cylindrical base 14 and dome-shaped outer cap 16. Housing 12 defines an enclosure having a delivery port 18 which allows activated fumigant in vapor form to escape into the ambient environment that is to be fumigated. Housing 12 is preferably made of a heat-resistant plastic or ceramic material, and may be formed by bonding or threading members 14 and 16 together.

A cavity for holding the fumigant may in a first embodiment be defined by a canister 20. Canister 20 is preferably a seamless, metallic (e.g. aluminum or steel) can suitable for conducting heat, and defines an open volume containing a heat-activatable chemical charge 22. A mouth/outlet 24 is made up of a plurality of openings extending axially through the axially outer end of canister 20. That outlet 24 is in communication with the delivery port 18, thereby allowing vapor form fumigant to escape out the device 10.

The chemical charge 22 preferably includes an active ingredient and optionally blowing agent for expelling activated fumigant from the cavity 20 by a self-sustaining chemical reaction. The blowing agent may combust, or, preferably, be a heat-activatable but non-combusting blowing agent, such as azodicarbonamide. The fumigant is preferably permethrin. However, a wide variety of synthetic and naturally occurring insecticides would also work. Further, a variety of fragrances, deodorizers and the like could also be the heat activatable insecticide.

If desired, a cover 26 can close the mouth 24 during storage, and thus effectively enclose the canister 20. The cover is preferably made of a material, such as a polypropylene film, that is sufficiently impervious to water and atmospheric gases so as to be able to protect the chemical charge 22 during storage. The cover 26 can be openable by the blowing agent to release the fumigant at the mouth 24, or less preferably it can be of the peel-off type. In particular, the cover may burst, melt, or otherwise open to facilitate the release of fumigant in response to the temperature or pressure generated by the blowing agent.

The fumigation device 10 further includes a plug 28 extending axially through base member. The electrical plug 28 is configured to be plugged into a conventional electrical outlet, regardless of orientation (not shown). The two prongs of the electrical plug define a lateral axis A—A.

A generally annular heating device 30 extends along a longitudinal axis B—B within the housing 12. In particular, the heating device 30 is substantially centrally disposed within canister 20, and is surrounded by the chemical charge 22. When the heating element is activated, the chemical charge becomes heated sufficient so as to first melt the solid pellets to create a somewhat flowable mass, and then produce a gaseous fumigant that exits device 10 as previously described.

Heating device 30 is electrically connected to plug 28 via electrical leads 33 that extend through corresponding rigid fingers to maintain the proper location of heating device 30 within canister 20. The heating device 30 is activatable by electricity delivered thereto via the electrical plug 28 during operation. Plug 28 extends axially through housing 12, and has a notch 29 extending outwardly therefrom that is embedded within a mounting plate 32 extending between canister walls 15 to form the base of the canister. Mounting plate is sufficiently thick to entirely encapsulate the notch 29 so as to prevent the plug from moving with respect to the housing.

Heat is produced by the conventional resistance heating device 30 when the plug 28 is inserted into an electrical outlet. The combination of plug 28 and heating device 30 cumulatively form a heating assembly 25. One preferred heater is a radial lead power resistor that can be purchased from IRC (Wirewound and Film Technologies Division) under the designation PWR or PWRG series. Because both the chemical charge and heating element 30 are disposed within the confines of canister walls 15, the charge is in direct thermal communication with the heating element 30, thus enabling highly efficient heating of the chemical charge upon activation of the device 10.

Cap 16 partially defines an internal trap 17 that is disposed downstream of mouth 24. Delivery port 18 is disposed axially downstream of the trap 17 such that any flowing chemical charge exiting canister 20 through mouth 24 will not exit the fumigation device, but rather will spill into the trap 17 (until/if it is vaporized). The inner diameter of cap 16 is greater than the inner diameter of canister 20 at mouth 24 such that spillage of the chemical charge within the housing 12 will also not impede the flow of vaporized fumigant out the delivery port 18.

Thus, the device 10 may advantageously be plugged into any electrical receptacle on a vertical wall (regardless of socket orientation), without risking the spillage of flowable chemical charge. This is so even if the initial chemical charge 22 occupies the entire cavity volume within canister 14, thus maximizing the fumigation potential of device 10.

During operation of the fumigation device 10, heat may be generated from both operation of the heating element 30 as well as the reaction of the blowing agent in the chemical charge 22. As a result, the housing 12 should be capable of withstanding that heat and retaining its structural integrity. In order to reduce the amount and intensity of the heat that is experienced by the housing 12, the canister 20 is preferably disposed inwardly with respect to the housing to define an insulating air gap 34 disposed there between. A pair of vents 36 may further extend through opposing side walls of housing 12 proximal their radially outer ends to replace heated air from the insulating air space 34 with cooler air from the ambient environment.

Preferably, the heating element 30 is non-renewably self-disabling after heating sufficiently to initiate the action of the blowing agent. Accordingly, use of the fumigation device 10 subsequent to the activation of the blowing agent is prevented. In particular, the heating element 30 is preferably destroyed non-renewably upon its first use, thereby requiring that the fumigation device 10 be a single use device.

Furthermore, because the canister may not be removed from the housing 12 without the effective destruction of the fumigation device 10, it is assured that the fumigation device 10 can only be used once.

The preferred heating device 30 implemented in accordance with the preferred embodiment is a resistance heater designed to break or otherwise become discontinuous after heating to a select temperature, thereby interrupting the flow of electricity through the fumigation device 10. Various such resistance heaters are known to those skilled in the art, including heaters utilizing a loop or wound coil of resistance wire. See generally U.S. Pat. No. 5,786,914.

The positioning of the delivery port 18 reduces the exposure of any wall above the device 10 to directly projected fumigant, and is more likely to direct fumigant towards the center of the space to be treated, resulting in a more uniform distribution throughout that space of fumigant and especially of fumigating smoke. As a result, the fumigation device 10 is made useful in a wider variety of circumstances than conventional fumigation devices.

To use the device one plugs it into an electrical outlet, and then allows electricity from the electrical outlet to activate the heating assembly 25, first to initiate the action of the blowing agent to release the active ingredient at the well mouth, and second to non-renewably self-disable the fumigation device, preventing its subsequent use. The heating device may be disposed entirely within the canister 20 as is illustrated in FIG. 2, or may be retained outside the canister (yet between housing walls) as illustrated in the FIG. 3 embodiment.

Figure 3:
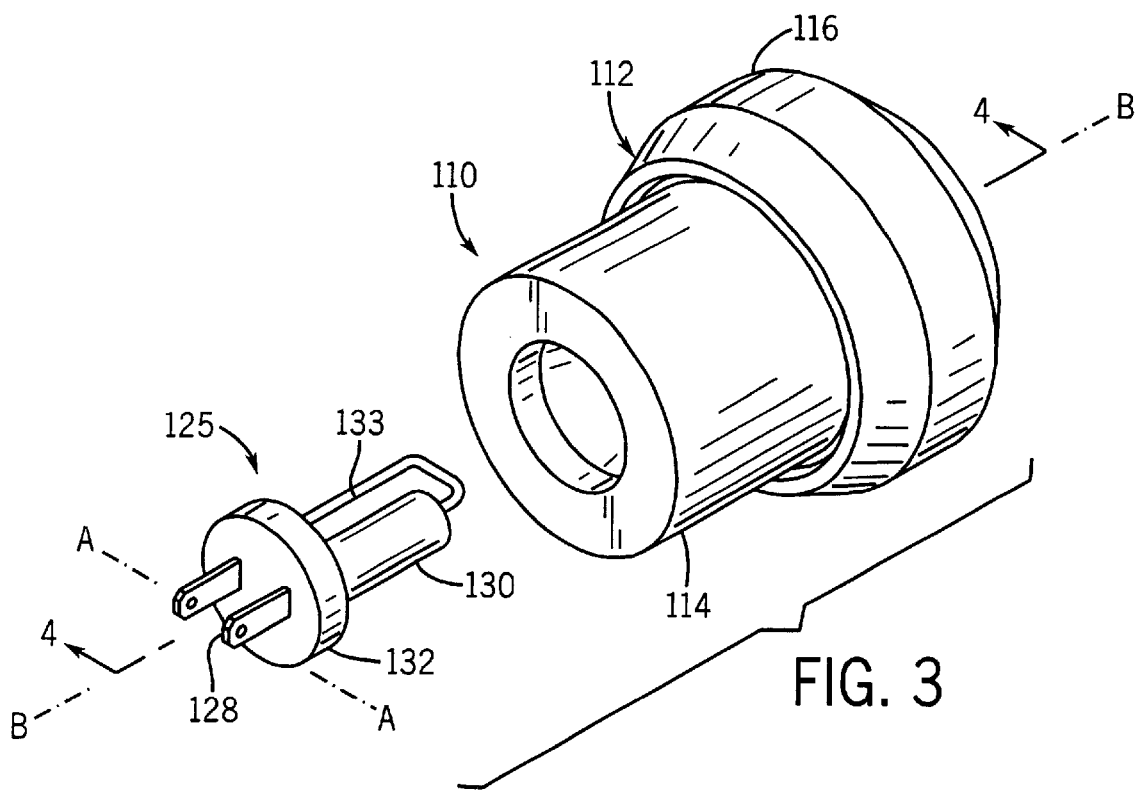
FIG. 3 is a rear upper perspective view of a second electrical fumigation device constructed in accordance with the invention.
Figure 4:
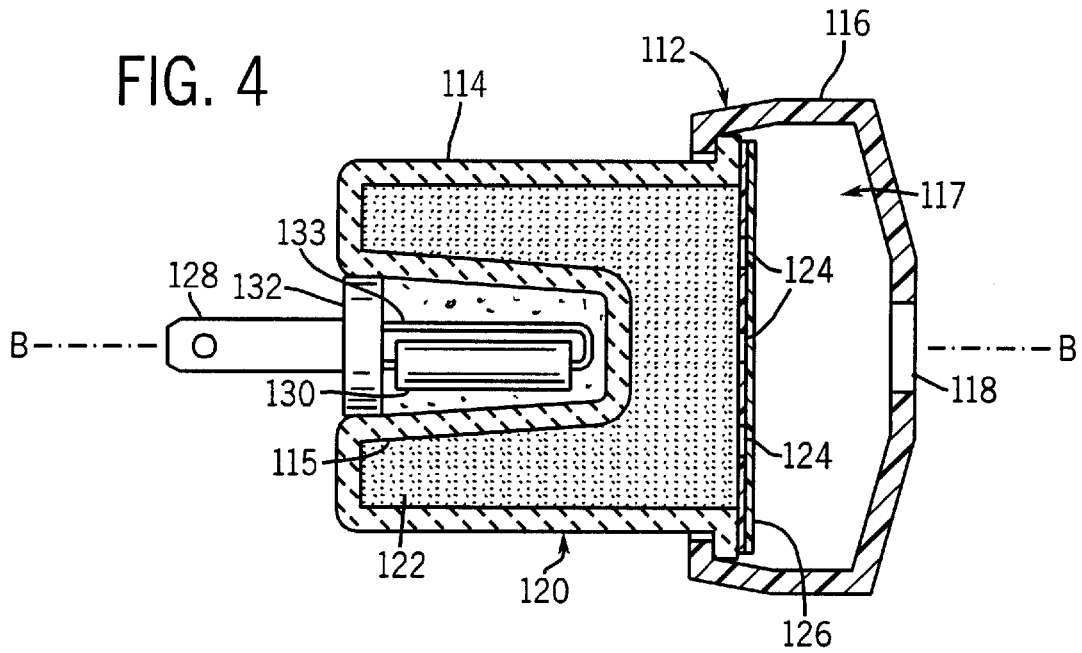
FIG. 4 is a cross sectional view taken along line 4—4 of FIG. 3.

FIGS. 3 and 4 illustrate a fumigation device 110 having reference numerals corresponding to like elements of the previous embodiment incremented by 100. In particular, the fumigation device 110 extends axially and comprises a housing 112 including an inner annular housing member 114 surrounded by a cap 116 at its outer end. A centrally disposed aperture 118 extending through cap 116 defines a delivery port that expels activated fumigant out the device 110.

The heating assembly 125 includes an electrical plug 128 that is fixedly attached to a mounting plate 132 at one end. The mounting plate 132 is attached to the inner radial wall of member 114 to fix the position of plug 128 with respect to housing 112. A heating device 130 is connected to the electrical plug 128 via an electrical lead 133 that extends through a rigid finger, and provides for electrical communication between the plug and heating device. As illustrated in FIG. 4, the heating device extends generally centrally into the housing member 114, but is outside of the fumigant containing cavity. The resistor is preferably potted in place with a conventional potting compound to secure the heater in place and provide thermal conduction to the fumigant.

Housing member 114 has an inner annular wall 115 that circumscribes the periphery of heating device 130 and electrical leads 133 to define a canister 120 having a chemical charge disposed therein. Heating device 130 extends almost the entire length of canister 120, and is generally centrally disposed with respect to the canister, whose radially inner annular wall 115 extends around heating device 130 in close proximity. Because a large surface area of canister 120 is presented that is heated directly by heating element 126, the chemical charge 122 is heated efficiently and uniformly.

The canister 120 has a mouth/outlet 124 disposed at its axially outer end comprising a plurality of apertures that permit the escape of activated fumigant from the canister. A cover 126 closes the opening 124 during storage.

Cap 116 defines an internal trap 117 that is disposed downstream of mouth 124, and serves to receive and retain any liquified chemical charge that may spill from mouth 124. Again, therefore, the fumigation device 110 may advantageously be plugged into an electrical receptacle in any desired orientation without risking the spillage of gelled chemical charge into the ambient environment. Furthermore, the chemical charge 122 may occupy the entire volume within canister 114, thus maximizing the fumigation potential of device 110.

Figure 5:
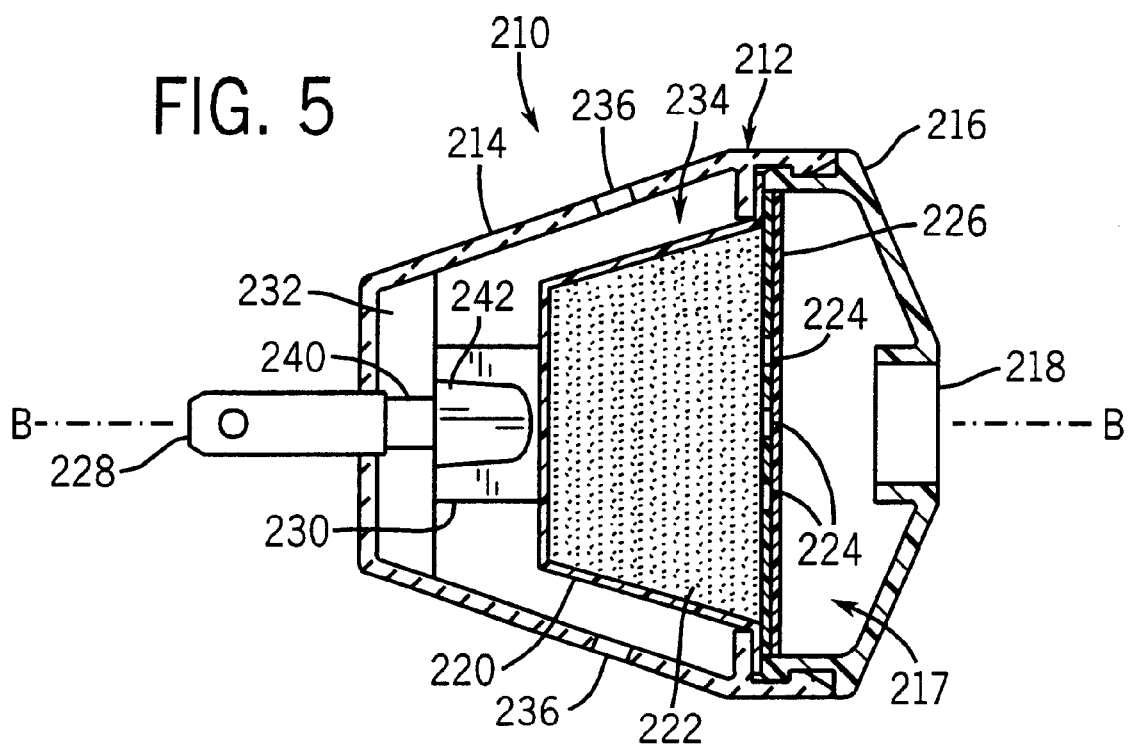
FIG. 5 is a cross sectional view, similar to FIG. 4, albeit of a third embodiment.
Figure 6:
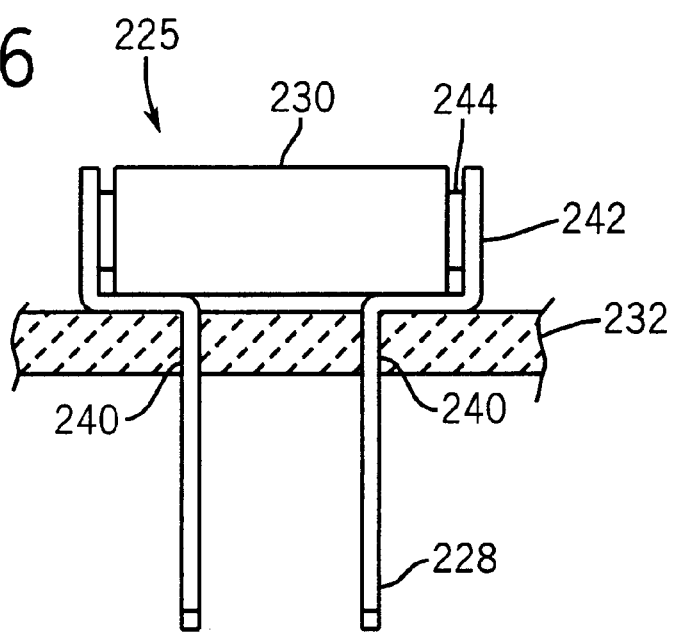
FIG. 6 is a plan view, partially in section view of a heating assembly of the FIG. 5 fumigation device.

Referring next to the embodiment of FIGS. 5 and 6, a fumigation device 210 is illustrated having reference numerals corresponding to like elements of the previous embodiment incremented by 100. Device 210 includes a housing 212 including a frustoconical base member 214 and a cap 216 disposed at its outer end. Cap 216 defines an internal well 217 that retains liquified chemical charge that escapes from mouth 224 of canister 220 during use. The heating assembly 225 includes a mounting plate 232 having a pair of apertures 240 extending axially there through that receive plug 228.

The plug extends axially downstream into two prongs of a fork 242 that retain heating device there between. Electrical leads 244 extend from the fork 242 to the heating device, which activates in response to the plug 228 being inserted into an electrical outlet.

As illustrated in FIG. 5, the plug 228 has a thickness greater than aperture 240 axially upstream of the aperture to prevent the heating assembly from moving axially with respect to the housing 212. Furthermore, the fork extends along the downstream surface of mounting plate 232, thereby fixing the position of heating assembly 225 with respect to the housing 212.

The heating device 230 is again disposed outside of the canister (in this case 220), and between radially outward walls of the housing. Because the canister 220 is made of a conducting material, such as steel or aluminum, the heat is effectively transferred throughout the canister, thereby resulting in the efficient heating of the chemical charge 222. Vents 236 provide for heat dissipation and trap 217 retains any liquified chemical charge that escapes the canister 220 through mouth 224 regardless of the angular orientation of the fumigation device 210.

Figure 7:
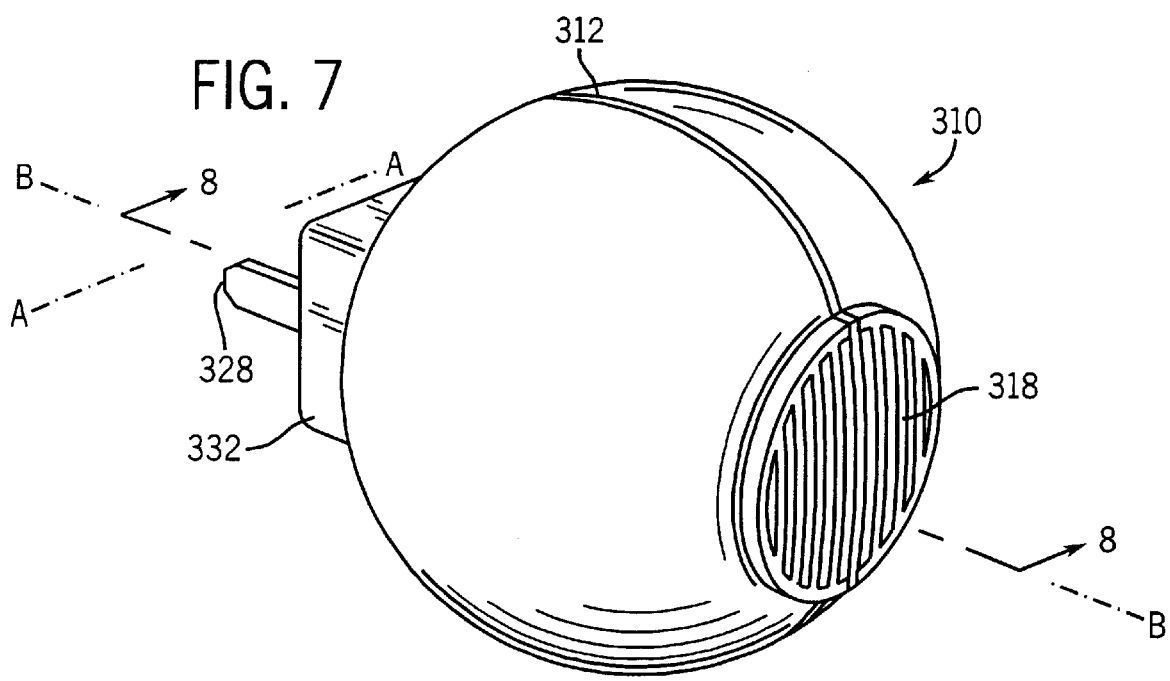
FIG. 7 is a front upper perspective view of a fourth embodiment of the present invention.
Figure 8:
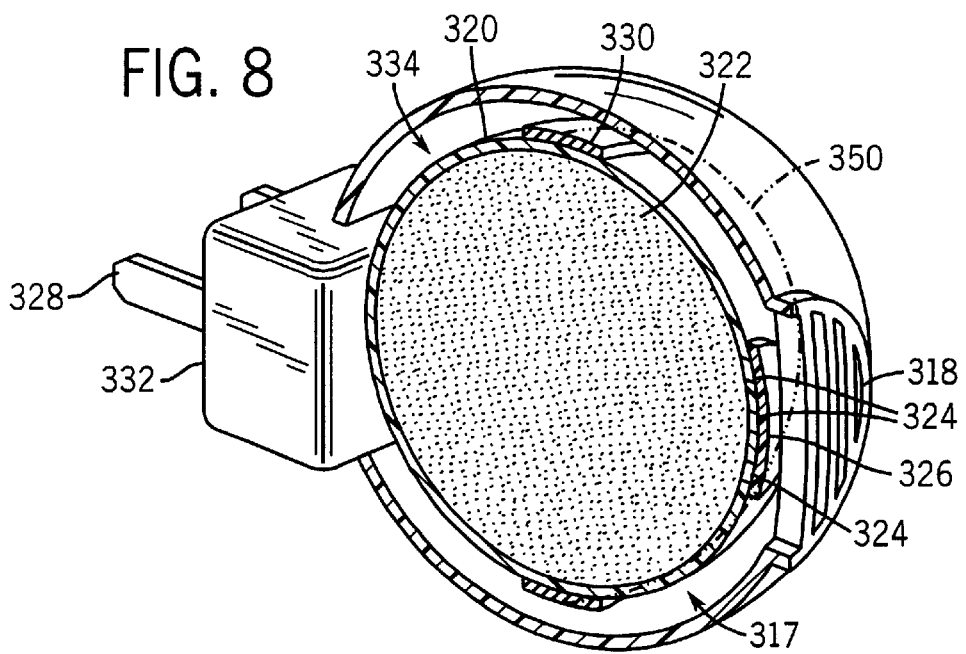
FIG. 8 is a cross sectional view taken along line 8—8 of FIG. 7.

Referring next to the embodiment of FIGS. 7 and 8, a fumigation device 310 constructed in accordance with yet another alternate embodiment is illustrated having reference numerals corresponding to like elements of the previous embodiment incremented by 100. Fumigation device 310 includes a spherical housing 312 formed from two hemispherical housing members mechanically connected together. A spherical canister 320 has a diameter slightly less than housing 312 and is concentrically disposed within the housing. Accordingly, an insulating air gap 334 is disposed between the canister 320 and housing 312.

Because the heating device 310 is spherical, fumigant 322 will always collect along the equator 350 of the housing 312 extending radially abound axis B—B when the device is properly plugged into an outlet so as to extend horizontally. The heating device 330, preferably a resistance heater, is in contact with the conductive canister and circumnavigates the equator 350 of the housing, thus ensuring the efficient heating of chemical charge 322. Furthermore, the insulating air gap 334 provides a well for any liquified chemical charge that escapes from the mouth 324 of canister 320. Accordingly, the gaseous chemical charge may escape the fumigation device 310 via mouth 324 and delivery port 318, which comprises a plurality of slots extending through the axially outer surface of housing 312.

Because the chemical charge collects along the equator 350, the delivery port could further comprise a plurality of apertures extending through housing 312 at a position radially offset from the horizontal axis B—B without risking the spillage of liquified chemical charge from the device 310.

Even though housing 312 is spherical, it should be appreciated that the device 310 nonetheless extends substantially in the horizontal direction during use as liquefied fumigant will spill into the well 334 rather than out the delivery port 318.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

INDUSTRIAL APPLICABILITY

The present invention provides a horizontally extending electric fumigator having a cavity that directs fumigant in a desired horizontal direction regardless of the orientation of the electrical outlet, while reducing the risk of spillage.

We claim:

1. An electric fumigation device, comprising:
   a housing including a delivery port positioned essentially along a longitudinal axis of the housing;
   a storage cavity located within the housing and containing a heat-activatable fumigant which when sufficiently heated can be a flowable gel or liquid, the cavity having an outlet in communication with the housing delivery port, the outlet being sized such that said fumigant can flow through the outlet when the fumigant is a flowable gel or liquid if the device is downwardly pointed; and
   a heater assembly having:
      an electrical plug extending outwardly from an end of the housing opposite the delivery port, the plug being configured to be received by an electrical outlet;
      a heater extending between outer radial walls of the housing, whereby the heating device is in electrical communication with the electrical plug and in thermal communication with the fumigant in the cavity; and
   a trap formed outside the cavity between the housing and heater, the trap being in part between the outlet and the delivery port.

2. The fumigation device as recited in claim 1, wherein the heater extends essentially horizontally between outer radial walls of the housing along the longitudinal axis of the housing.

3. The fumigation device as recited in claim 1, wherein the delivery port comprises a horizontally extending aperture downstream of the cavity.

4. The fumigation device as recited in claim 1, wherein the heater extends into the cavity.

5. The fumigation device as recited in claim 1, wherein the heater is disposed entirely outside the cavity.

6. The fumigation device as recited in claim 1, wherein the housing and heater are both essentially ball-shaped.

7. A method of fumigating an area in which an electrical receptacle is mounted on a wall with a fumigant, the method comprising the steps of:
   providing an electrically activatable device of claim 1;
   plugging the fumigating device into the electrical receptacle; and
   allowing electricity from the electrical receptacle to cause a release of the fumigant.

* * * * *